(12) United States Patent
Bolanos et al.

(10) Patent No.: US 11,355,139 B2
(45) Date of Patent: Jun. 7, 2022

(54) REAL-TIME VS NON-REAL TIME AUDIO STREAMING

(71) Applicant: International Business Machines Corporation, Armonk, NY (US)

(72) Inventors: Daniel Bolanos, Mohegan Lake, NY (US); Susan L. Diamond, Poughkeepsie, NY (US); Santosh Subhashrao Borse, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/028,261

(22) Filed: Sep. 22, 2020

(65) Prior Publication Data

US 2022/0093119 A1     Mar. 24, 2022

(51) Int. Cl.
*G10L 21/00*     (2013.01)
*G10L 25/00*     (2013.01)
(Continued)

(52) U.S. Cl.
CPC .............. *G10L 25/51* (2013.01); *G10L 15/26* (2013.01)

(58) Field of Classification Search
CPC ... H04L 65/80; H04L 65/4084; H04L 65/607; H04L 65/608; H04L 47/38; H04L 65/4069; H04L 67/14; H04L 1/004; H04L 47/624; H04L 67/42; H04L 47/2416; H04L 65/4092; H04L 65/60; H04L 65/601; H04L 47/25; H04L 67/2842; H04L 67/2847; H04L 47/10; H04L 47/283; H04L 1/0002; H04L 29/06027; H04L 41/0896; H04L 41/5022; H04L 41/5025; H04L 43/0864; H04L 43/16; H04L 47/00; H04L 47/30; H04L 47/6215; H04L 67/101; H04N 21/4126; H04N 21/2402; H04N 21/2662; H04N 21/8456; H04N 21/44004; H04N 21/64738; H04N 19/136; H04N 19/146;
(Continued)

(56) References Cited

U.S. PATENT DOCUMENTS 9,245,525 B2    1/2016  Yeracaris
9,712,570 B1 *  7/2017  Ivov .................. H04L 65/605
(Continued)

FOREIGN PATENT DOCUMENTS

CN      1463163 A      12/2003
CN    102783170 A      11/2012
(Continued)

OTHER PUBLICATIONS

Patent Cooperation Treaty PCT International Search Report, Applicants File Reference EIE210516PCT, International Application No. PCT/CN2021/107788, International filing date Jul. 22, 2021, dated Oct. 21, 2021.
(Continued)

*Primary Examiner* — Kharye Pope
(74) *Attorney, Agent, or Firm* — Alexander G. Lochym

(57) ABSTRACT

One or more audio data is received. An expected bitrate of the one or more audio data is determined. An input bitrate of the one or more audio data is determined. An R value using the expected bitrate and the input bitrate is determined. The R value is compared to an R threshold.

14 Claims, 3 Drawing Sheets

(51) Int. Cl.
*G10L 25/51* (2013.01)
*G10L 15/26* (2006.01)

(58) Field of Classification Search
CPC ........... H04N 21/44209; H04N 19/184; H04N 21/64723; H04N 21/6377; H04N 21/658; H04W 4/20; H04W 72/1242; H04W 28/22; H04W 52/0206; H04W 72/087; H04W 88/02; H04W 28/10; H04W 36/0011; H04W 36/30; H04W 72/1268
USPC ............ 370/235, 230, 352, 465; 375/240.02, 375/7.126, 7.014, 7.025
See application file for complete search history.

(56) References Cited

U.S. PATENT DOCUMENTS

| | | | |
|---|---|---|---|
| 10,524,024 | B1 | 12/2019 | Wu |
| 2009/0067328 | A1* | 3/2009 | Morris .............. H04W 72/1242 370/230.1 |
| 2014/0086073 | A1* | 3/2014 | Baykal ................ H04L 41/5067 370/252 |
| 2015/0255076 | A1* | 9/2015 | Fejzo .................... G10L 19/008 704/500 |
| 2017/0257411 | A1* | 9/2017 | Veeramani ............ H04L 65/604 |
| 2017/0332282 | A1* | 11/2017 | Dao .................... H04W 72/087 |
| 2018/0004714 | A1* | 1/2018 | Munoz ............... H04N 21/4825 |
| 2018/0241796 | A1* | 8/2018 | Srinivasan .......... H04L 65/4084 |
| 2019/0297327 | A1* | 9/2019 | Mao ..................... H04N 19/172 |
| 2019/0339997 | A1* | 11/2019 | Momchilov ........ H03M 13/353 |
| 2019/0342551 | A1* | 11/2019 | Zhu ...................... H04N 19/149 |
| 2019/0356720 | A1 | 11/2019 | Hosur |
| 2020/0128253 | A1* | 4/2020 | Zhou ...................... H04N 19/85 |
| 2020/0195567 | A1* | 6/2020 | Selvidge ............. H04L 43/0829 |

FOREIGN PATENT DOCUMENTS

| | | |
|---|---|---|
| CN | 103501429 A | 1/2014 |
| CN | 103544957 A | 1/2014 |
| CN | 109640159 A | 4/2019 |
| WO | 2013184520 A1 | 12/2013 |

OTHER PUBLICATIONS

Authors et al. Disclosed Anonymously, "Crowdsourcing Training Data for Real-Time Transcription Models", An IP.com Prior Art Database Technical Disclosure, IP.com No. IPCOM000255939D, IP.com Electronic Publication Date: Oct. 24, 2018, 6 Pages.

Authors et al. Disclosed Anonymously, "Real Time Cultural Analysis Based on Streamed Voice Data to Improve Product Quality", An IP.com Prior Art Database Technical Disclosure, IP.com No. IPCOM000246251D, IP.com Electronic Publication Date: May 19, 2016, 2 Pages.

Authors et. al. Disclosed Anonymously, "Near real-time automatic speech recognition using speaker change events", An IP.com Prior Art Database Technical Disclosure, IP.com No. IPCOM000201741D, IP.com Electronic Publication Date: Nov. 21, 2010, 4 Pages.

Faria, Arlo, "Discriminative Acoustic Features for Deployable Speech Recognition", Electrical Engineering and Computer Sciences, University of California at Berkeley, Technical Report No. UCB/EECS-2016-199, Dec. 13, 2016, 142 Pages.

He et al., "Streaming End-To-End Speech Recognition for Mobile Devices", Google, Inc., USA, arXiv:1811.06621v1, [cs.CL], Nov. 15, 2018, 5 Pages.

Makhijani et al., "Opportunities and Challenges in Automatic Speech Recognition", Proceedings of the International Conference BEATS 2010, NIT Jalandhar, India, arXiv:1305.2846, Submitted on May 9, 2013, 5 Pages.

Manousek et al., "What is batch transcription?", Microsoft, United States, Mar. 18, 2020, 15 Pages.

* cited by examiner

REAL-TIME VS NON-REAL TIME AUDIO STREAMING

BACKGROUND

The present invention relates generally to the field of audio streaming, and more particularly to determining real-time vs. non-real time audio streaming for improved audio to text conversion.

Speech to text converts the spoken language into text. Speech recognition develops methodologies and technologies that enable the recognition and translation of spoken language into text by computer. Speech recognition can also be known as automate speech recognition (ASR), computer speech recognition, or speech to text (STT). Some speech recognition systems require "training" where an individual speaker reads text or isolated vocabulary into the system. The system analyzes the person's specific voice ad uses it to fine-tune the recognition of that person's speech, resulting in increased accuracy. Some systems do not use training and are called "speaker independent" systems.

SUMMARY

Embodiments of the present invention include a computer-implemented method, computer program product, and system for determining real-time vs. non-real time audio streaming. In one embodiment, one or more audio data is received. An expected bitrate of the one or more audio data is determined. An input bitrate of the one or more audio data is determined. An R value using the expected bitrate and the input bitrate is determined. The R value is compared to an R threshold.

DETAILED DESCRIPTION

The present invention provides a method, computer program product, and computer system to automatically discriminate between real-time and non-real time so the most suitable techniques of speech to text can be applied in each case resulting in more accurate transcripts and lower overall cost. The detection is based on performing a comparison between the bitrate of the incoming audio received and the encoding bitrate of the audio.

Embodiments of the present invention recognize that not all audio is real-time or non-real time. Embodiments of the present invention recognize that it may be more costly to perform speech to text of real-time audio vs. non-real time audio.

Embodiments of the present invention recognize that there are benefits of knowing whether a stream of audio must be processed in real-time with low latency, from both the quality of service and cost perspective. If it is known that the audio stream can be processed in batch (i.e. recognition transcripts do not need to be delivered to a user in real-time), then it is possible to apply more sophisticated speech-to-text techniques that work from the beginning to the end of utterance in the audio and vice versa (bi-directional) which may result in higher accuracy. It also is possible to perform multiple passes over the same utterance in the audio since the end of the utterance is known beforehand, which leads to increased accuracy. Additionally, it is possible to utilize larger batches during inference, which speeds up computation of speech-to-text as low latency constraints are not compatible with larger batch processing of audio. Additionally, if an audio stream can be processed in batch, a lower priority can be given to the audio stream in order to align computational resources to latency critical audio jobs first.

Figure 1:
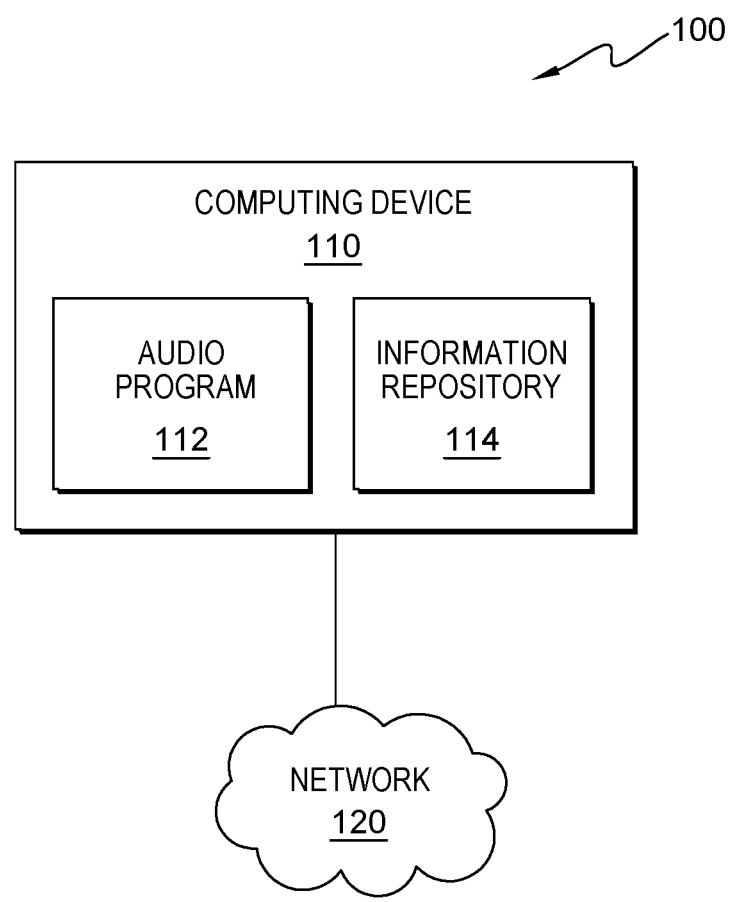
FIG. 1 is a functional block diagram of a network computing environment, generally designated 100, suitable for operation of audio program 112, in accordance with at least one embodiment of the invention.

Referring now to various embodiments of the invention in more detail, FIG. 1 is a functional block diagram of a network computing environment, generally designated 100, suitable for operation of audio program 112 in accordance with at least one embodiment of the invention. FIG. 1 provides only an illustration of one implementation and does not imply any limitation with regard to the environments in which different embodiments may be implemented. Many modifications to the depicted environment may be made by those skilled in the art without departing from the scope of the invention as recited by the claims.

Network computing environment 100 includes computing device 110 interconnected over network 120. In embodiments of the present invention, network 120 can be a telecommunications network, a local area network (LAN), a wide area network (WAN), such as the Internet, or a combination of the three, and can include wired, wireless, or fiber optic connections. Network 120 may include one or more wired and/or wireless networks that are capable of receiving and transmitting data, voice, and/or video signals, including multimedia signals that include voice, data, and video formation. In general, network 120 may be any combination of connections and protocols that will support communications between computing device 110 and other computing devices (not shown) within network computing environment 100.

Computing device 110 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, computing device 110 represents any programmable electronic devices or combination of programmable electronic devices capable of executing machine readable program instructions and communicating with other computing devices (not shown) within computing environment 100 via a network, such as network 120.

In various embodiments of the invention, computing device 110 may be a computing device that can be a standalone device, a management server, a web server, a media server, a mobile computing device, or any other programmable electronic device or computing system capable of receiving, sending, and processing data. In other embodiments, computing device 110 represents a server computing system utilizing multiple computers as a server system, such as in a cloud computing environment. In an embodiment, computing device 110 represents a computing system utilizing clustered computers and components (e.g. database server computers, application server computers, web servers, and media servers) that act as a single pool of seamless resources when accessed within network computing environment 100.

In various embodiments of the invention, computing device 110 includes audio program 112 and information repository 114.

In an embodiment, computing device 110 includes a user interface (not shown). A user interface is a program that provides an interface between a user and an application. A user interface refers to the information (such as graphic, text, and sound) a program presents to a user and the control sequences the user employs to control the program. There are many types of user interfaces. In one embodiment, a user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In an embodiment, computing device 110 includes audio program 112. Embodiments of the present invention provide for an audio program 112 that receives audio data. In embodiments of the present invention, audio program 112 determines the expected bitrate. In embodiments of the present invention, audio program 112 determines the input bitrate. In embodiments of the present invention, audio program 112 determines an R value. In embodiments of the present invention, audio program 112 determines whether the R value is bigger than a threshold. In embodiments of the present invention, audio program 112 adds the audio to a real-time audio list. In embodiments of the present invention, audio program 112 adds the audio to the batch audio list. In embodiments of the present invention, audio program 112 waits a time threshold.

In an embodiment, computing device 110 includes information repository 114. In an embodiment, information repository 114 may be managed by audio program 112. In an alternative embodiment, information repository 114 may be managed by the operating system of computing device 110, another program (not shown), alone, or together with, audio program 112. Information repository 114 is a data repository that can store, gather, and/or analyze information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided information repository 114 is accessible by computing device 110. Information repository 114 may include, but is not limited to, speech to text settings, R values, input bitrate, expected bitrate, list of batch audio, list of real-time audio, R threshold, time threshold, etc.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

As referred to herein, all data retrieved, collected, and used, is used in an opt-in manner, i.e., the data provider has given permission for the data to be used. For example, the received data received and used by audio program 112 determining real-time vs. non-real time audio streaming.

Figure 2:
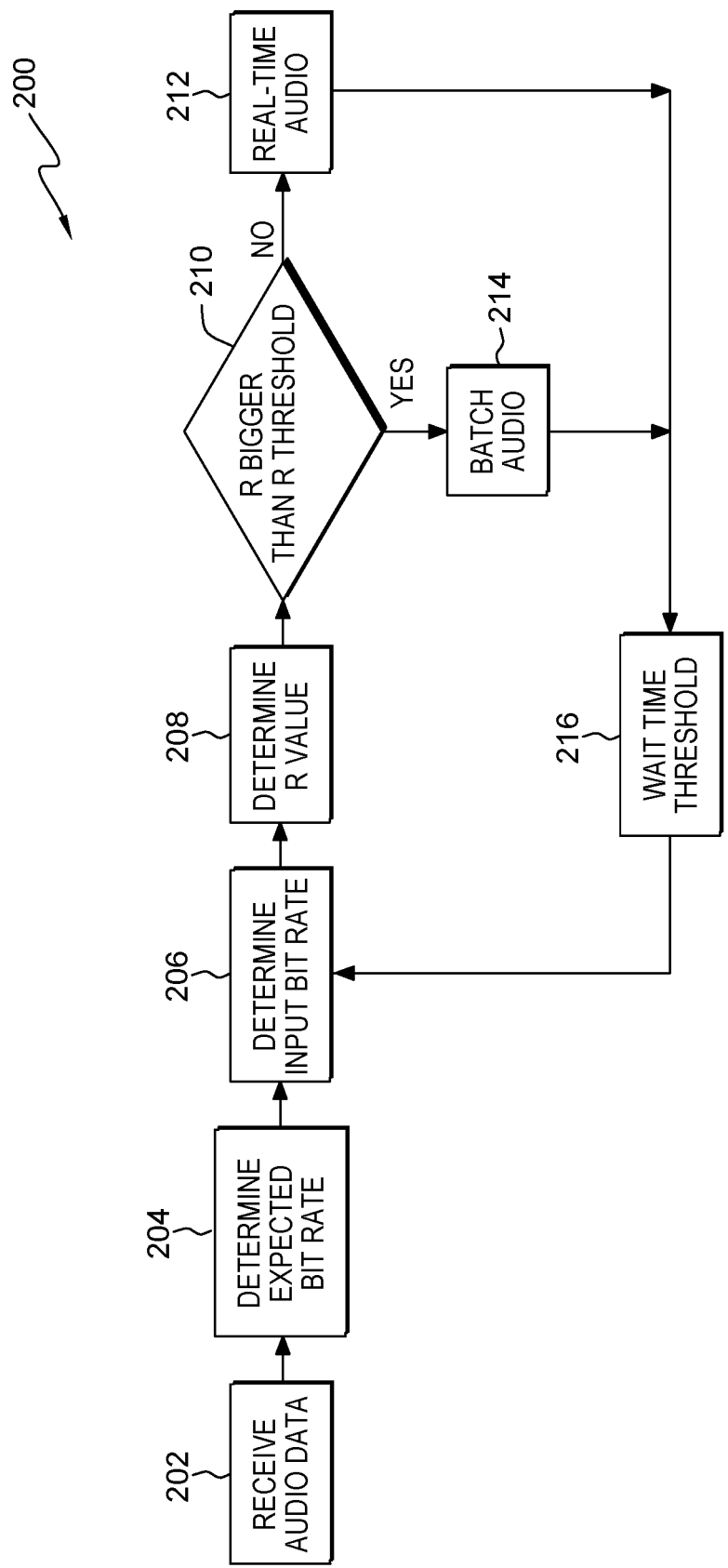
FIG. 2 is a flow chart diagram depicting operational steps for audio program 112 for determining real-time vs. non-real time audio streaming, in accordance with at least one embodiment of the invention.

FIG. 2 is a flow chart diagram of workflow 200 depicting operational steps for audio program 112 in accordance with at least one embodiment of the invention. In an alternative embodiment, the steps of workflow 200 may be performed by any other program while working with audio program 112. It should be appreciated that embodiments of the present invention provide at least for determining real-time vs. non-real time audio streaming. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via a user interface (not shown), can invoke workflow 200 upon a user wanting audio program 112 to determine real-time vs. non-real time audio streaming.

Audio program 112 receives audio data (step 202). At step 202, audio program 112 receives audio data via network 120. In an embodiment, the audio data may not have been classified as real-time vs non-real time audio. In alternative embodiment, audio program 112 receives audio data that is stored in information repository 114 via an indication from a user via the user interface. In an embodiment, audio program 112 may receive a single piece of audio data. In an alternative embodiment, audio program 112 may one or more pieces of audio data in a continual flow. In an embodiment, audio program 112 may receive audio that that is associated with corresponding video data. In an embodiment, audio program 112 may analyze a first chunk of audio data that is received within a threshold time. In other words, audio program 112 may start to receive audio data, wait a threshold time (i.e. three seconds), and then proceed to the next steps regardless of if the entire piece of audio data is received. In an embodiment, the received audio data may include a header that indicates the audio data is either real-time or non-real time audio. Here, processing can proceed directly to step 212 in the case of real-time audio and step 214 in the case of non-real time audio. In an embodiment, the received audio may be a request to convert speech (audio) into text. In an embodiment, the request may be an HTTP/Websocket request or any other known network protocol known in the art.

Audio program 112 determines the expected bitrate (step 204). At step 204, audio program 112 determines the expected bitrate of the received audio data. In an embodiment, the expected bitrate is determined from the header of the received audio data and more specifically from the metadata found within the header. In an embodiment, the expected bitrate is listed in the metadata of the header. Alternatively, in an embodiment, the sampling rate and the sampling size are listed in the metadata of the header and the expected bitrate is calculated by multiplying the sampling rate by the sample size. In an alternative embodiment, when the audio data does not include a header, the expected bitrate is calculated based on the sampling rate value and bytes per sample value coming in the content type header within the received audio.

Audio program 112 determines the input bitrate (step 206). At step 206, audio program 112 determines the input bitrate of the received audio data. In an embodiment, the input bitrate is determined based on how fast the bytes of the audio are received by computing device 110 via network 120. In an embodiment, audio program 112 may receive this information from the operating system of computing device 110 or any other program functioning on computing device 110.

Audio program 112 determines the R value (decision step 208). At step 208, audio program 112 determines the R value for the received audio data. In an embodiment, the R value is calculated by dividing the input bitrate by the expected bitrate. In an embodiment, the R value is stored in information repository 114.

Audio program 112 determines whether R is bigger than a R threshold (decision step 210). At decision step 210, audio program 112 compares the R value to an R threshold. If the R value is not bigger than a R threshold (decisions step 210, no branch), then processing proceeds to real-time audio (step 212). If the R is bigger than a R threshold (decisions step 210, yes branch), then processing proceeds to batch audio (step 214).

Audio program 112 determines real-time audio (step 212). At step 212, audio program 112 determines the received audio data is real-time audio. In an embodiment, audio program 112 may process the received audio using techniques known in the art for processing real-time audio. In an embodiment, audio program 112 may add the received audio data to a real-time audio list or queue for processing by another program, not shown. In an embodiment, audio on the real-time audio list is processed at a higher priority than audio on the batch audio list.

Audio program 112 determines batch audio (step 214). At step 214, audio program 112 determines the received audio data is batch audio. In an embodiment, audio program 112 may process the received audio using techniques known in the art for processing batch audio. In an embodiment, audio program 112 may add the received audio data to a batch audio list or queue for processing by another program, not shown. In an embodiment, audio on the batch audio list is processed at a lower priority than audio on the real-time audio list.

Audio program 112 waits a time threshold (step 216). At step 216, audio program 112 waits a time threshold before proceeding to step 206. In an embodiment, audio program 112 may receive the time threshold at the time of receiving the audio data from a user via a user interface. In an alternative embodiment, the time threshold may be stored in information repository 114 as a user preference. In yet another alternative embodiment, the time threshold may change based on the time and/or day of processing based on preferences stored in information repository 114. In an embodiment, the larger the time threshold, the better reliability of detection of real-time vs. batch audio. In the alternative embodiment, the smaller the time threshold, the earlier the detection of real-time vs. batch audio. It should be noted, that waiting the time threshold allows for an audio file to be classified as real-time and then as further time passes the audio file can change to be classified as bath audio. This allows for changes in the speed of receiving the audio file due to network 120 issues such as bandwidth and latency. In an embodiment, the time threshold may be based on the time of the day, day of the week, or a calendar. For example, the time threshold may be larger on the weekend (when not much is processed) and smaller during the week (when more is processed).

It should be noted, at any time the piece of audio data may end, for example the audio data being processed has reached the end of the audio, and a new piece of audio data may be next in line to be processed by audio program 112. In this embodiment, upon receive a new piece of audio data, processing will begin with step 202.

In an example, a twenty MB audio file is received by computing device 110 for processing by audio program 112. Here, the file contains ten minutes of audio. In a first example, the file may be received by audio program 112 in just a few second, only limited by the bandwidth via network 120. Therefore, the audio file is determined to be batch audio. However, in a second example, if the audio file comes in at a speed closer to real-time audio then the audio file is determined to be real-time audio.

To provide a further detailed example, if an audio stream received is encoded at 16 kHz and 2 bytes per sample, which corresponds to 32 KB/s, and the audio is coming at an average bitrate of 40 KB/s then we know the stream is not coming in real-time, but much faster, so we have a batch use case. However, if the bitrate of the input stream is about 32 KB/s plus/minus a small delta then we know the stream is likely real-time.

Figure 3:
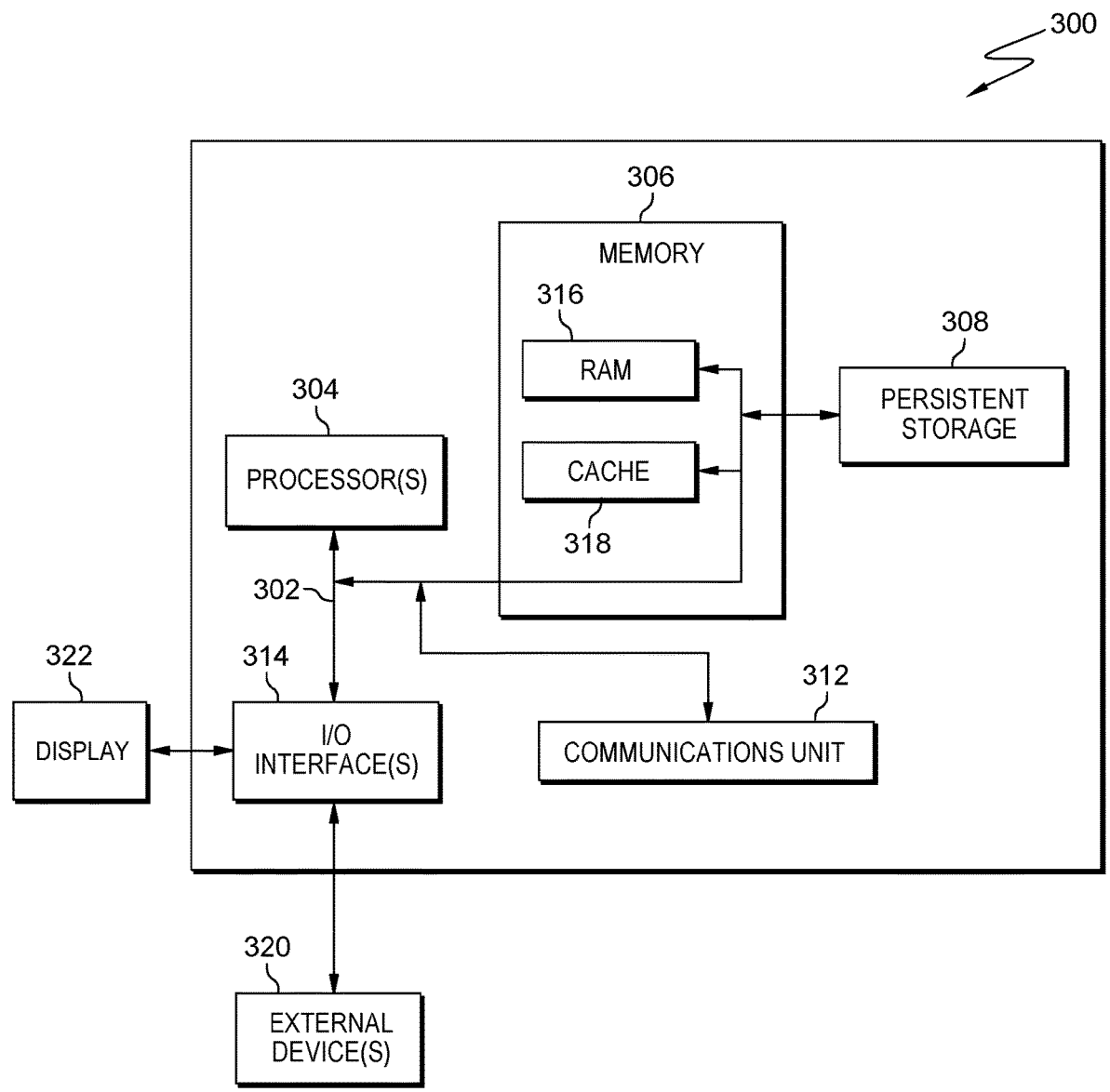
FIG. 3 is a block diagram depicting components of a computer, generally designated 300, suitable for executing audio program 112, in accordance with at least one embodiment of the invention.

FIG. 3 is a block diagram depicting components of a computer 300 suitable for audio program 112, in accordance with at least one embodiment of the invention. FIG. 3 displays the computer 300, one or more processor(s) 304 (including one or more computer processors), a communications fabric 302, a memory 406 including, a RAM 316, and a cache 318, a persistent storage 308, a communications unit 312, I/O interfaces 314, a display 322, and external devices 320. It should be appreciated that FIG. 3 provides only an illustration of one embodiment and does not imply any limitations with regard to the environments in which different embodiments may be implemented. Many modifications to the depicted environment may be made.

As depicted, the computer 300 operates over the communications fabric 302, which provides communications between the computer processor(s) 304, memory 306, persistent storage 308, communications unit 312, and input/output (I/O) interface(s) 314. The communications fabric 302 may be implemented with an architecture suitable for passing data or control information between the processors 304 (e.g., microprocessors, communications processors, and network processors), the memory 306, the external devices 320, and any other hardware components within a system. For example, the communications fabric 302 may be implemented with one or more buses.

The memory 306 and persistent storage 308 are computer readable storage media. In the depicted embodiment, the memory 306 comprises a random-access memory (RAM) 316 and a cache 318. In general, the memory 306 may comprise any suitable volatile or non-volatile one or more computer readable storage media.

Program instructions for audio program 112 may be stored in the persistent storage 308, or more generally, any computer readable storage media, for execution by one or more of the respective computer processors 304 via one or more memories of the memory 306. The persistent storage 408 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 312, in these examples, provides for communications with other data processing systems or devices. In these examples, the communications unit 312 may comprise one or more network interface cards. The communications unit 312 may provide communications through the use of either or both physical and wireless communications links. In the context of some embodiments of the present invention, the source of the various input data may be physically remote to the computer 300 such that the input data may be received, and the output similarly transmitted via the communications unit 312.

The I/O interface(s) 314 allow for input and output of data with other devices that may operate in conjunction with the computer 300. For example, the I/O interface 314 may provide a connection to the external devices 320, which may be as a keyboard, keypad, a touch screen, or other suitable input devices. External devices 320 may also include portable computer readable storage media, for example thumb drives, portable optical or magnetic disks, and memory cards. Software and data used to practice embodiments of the present invention may be stored on such portable computer readable storage media and may be loaded onto the persistent storage 308 via the I/O interface(s) 314. The I/O interface(s) 314 may similarly connect to a display 322. The display 322 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider). In some embodiments, electronic circuitry including, for example programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram blocks or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for determining real-time vs. non-real time audio streaming, the computer-implemented method comprising:
    receiving, by one or more computer processors, one or more audio data;
    determining, by one or more computer processors, an expected bitrate for each audio data of the one or more audio data;
    determining, by one or more computer processors, an input bitrate for each audio data of the one or more audio data;
    calculating, by one or more computer processors, an R value for each audio data of the one or more audio data using the expected bitrate and the input bitrate for each audio data;
    comparing, by one or more computer processors, the R value for each audio data of the one or more audio data to an R threshold, wherein if the R value for an audio data is larger than the R threshold, adding, by one or more computer processors, the audio data to a batch audio list; and wherein if the R value for the audio data is smaller than the R threshold, adding, by one or more computer processors, the audio to the real-time audio list; and
    processing, by one or more computer processors, any audio on the batch audio list using speech-to text techniques that perform multiple passes over the audio on the batch audio list and processing any audio on the real-time audio list immediately.

2. The computer-implemented method of claim 1, wherein the comparing is done after a threshold period of time.

3. The computer-implemented method of claim 1, further comprising:
    processing, by one or more computer processors, the one or more audio data on the batch audio list using a lower priority than any one or more audio on the real-time audio list.

4. The computer-implemented method of claim 1, further comprising:
    processing, by one or more computer processors, the one or more audio data on the real-time audio list using a higher priority than any one or more audio on the batch audio list.

5. The computer-implemented method of claim 1, wherein the R value is calculated by dividing the input bitrate by the expected bitrate.

6. A computer program product for determining real-time vs. non-real time audio streaming, the computer program product comprising:
    one or more computer readable storage media; and
    program instructions stored on the one or more computer readable storage media, the program instructions comprising:
        program instructions to receive one or more audio data;
        program instructions to determine, by one or more computer processors, an expected bitrate for each audio data of the one or more audio data;
        program instructions to determine, by one or more computer processors, an input bitrate for each audio data of the one or more audio data;
        program instructions to calculate, by one or more computer processors, an R value for each audio data of the one or more audio data using the expected bitrate and the input bitrate for each audio data;
        program instructions to compare the R value for each audio data of the one or more audio data to an R threshold, wherein if the R value for an audio data is larger than an R threshold, program instructions to add the audio data to a batch audio list; and wherein if the R value for the audio data is smaller than the R threshold, program instructions to add the audio to the real-time audio list; and
        program instructions to process any audio on the batch audio using speech-to text techniques that perform multiple passes over the audio on the batch audio list and and program instructions to process any audio on the real-time audio list immediately.

7. The computer program product of claim 6, wherein the comparing is done after a threshold period of time.

8. The computer program product of claim 6, further comprising program instructions, stored on the one or more computer readable storage media, to:
    process the one or more audio data on the batch audio list using a lower priority than any one or more audio on the real-time audio list.

9. The computer program product of claim 6, further comprising program instructions, stored on the one or more computer readable storage media, to:
    process the one or more audio data on the real-time audio list using a higher priority than any one or more audio on the batch audio list.

10. The computer program product of claim 6, wherein the R value is calculated by dividing the input bitrate by the expected bitrate.

11. A computer system for determining real-time vs. non-real time audio streaming, the computer system comprising:
  one or more computer processors;
  one or more computer readable storage media; and
  program instructions, stored on the one or more computer readable storage media for execution by at least one of the one or more computer processors, the program instructions comprising:
    program instructions to receive one or more audio data;
    program instructions to determine, by one or more computer processors, an expected bitrate for each audio data of the one or more audio data;
    program instructions to determine, by one or more computer processors, an input bitrate for each audio data of the one or more audio data;
    program instructions to calculate, by one or more computer processors, an R value for each audio data of the one or more audio data using the expected bitrate and the input bitrate for each audio data;
    program instructions to compare the R value for each audio data of the one or more audio data to an R threshold, wherein if the R value for an audio data is larger than an R threshold, program instructions to add the audio data to a batch audio list; and wherein if the R value for the audio data is smaller than the R threshold, program instructions to add the audio to the real-time audio list; and
    program instructions to process any audio on the batch audio using speech-to text techniques that perform multiple passes over the audio on the batch audio list and and program instructions to process any audio on the real-time audio list immediately.

12. The computer system of claim 11, wherein the comparing is done after a threshold period of time.

13. The computer system of claim 11, further comprising program instructions, stored on the one or more computer readable storage media for execution by at least one of the one or more computer processors, to:
  process the one or more audio data on the batch audio list using a lower priority than any one or more audio on the real-time audio list.

14. The computer system of claim 11, further comprising program instructions, stored on the one or more computer readable storage media for execution by at least one of the one or more computer processors, to:
  process the one or more audio data on the real-time audio list using a higher priority than any one or more audio on the batch audio list.

* * * * *